(12) United States Patent
Hawkins et al.

(10) Patent No.: US 7,340,039 B1
(45) Date of Patent: Mar. 4, 2008

(54) METHOD FOR PROVIDING DIGITAL LOOP CARRIER DATA FOR USE IN A CENTRAL OFFICE

(75) Inventors: Richard C. Hawkins, Hampton, GA (US); Clifford Gaskins, McDonough, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 1203 days.

(21) Appl. No.: 10/251,048

(22) Filed: Sep. 20, 2002

(51) Int. Cl.
*H04M 1/24* (2006.01)
*H04M 3/08* (2006.01)
*H04M 3/22* (2006.01)

(52) U.S. Cl. .............. 379/9.04; 379/9.02; 379/15.01; 379/22.04

(58) Field of Classification Search .............. 379/9, 379/9.02, 9.04, 14, 10.01, 15.01, 15.02, 22.04, 379/25, 201.12, 325
See application file for complete search history.

(56) References Cited

U.S. PATENT DOCUMENTS

| 5,881,131 A * | 3/1999 | Farris et al. ............. 379/15.03 |
| 5,953,389 A * | 9/1999 | Pruett et al. ................ 379/9 |
| 6,614,882 B1 * | 9/2003 | Beamon et al. .......... 379/27.01 |

\* cited by examiner

Primary Examiner—Quoc Tran
(74) Attorney, Agent, or Firm—Merchant & Gould

(57) ABSTRACT

The present invention provides a digital loop carrier ("DLC") information system that provides information for use in a central office. The DLC information system includes four related databases. A DLC system database provides information about DLC systems, a multiplexer database provides information about multiplexers associated with the DLC systems, an equipment location database provides information about the location of the DLC systems and a test pair database provides information about the test pairs used to test the DLC systems. The information in each of the databases is related using the system identifiers for the DLC systems.

25 Claims, 14 Drawing Sheets

---

SID: 5003

| Eq Type: SLC5 | MUX Type: DDM-1000 |
|---|---|
| Ca-First Pair: PG72-1801 | Bay-SH-Muldem: 209.02-7-B |
| Integrated: N | MUX Port: 5-1 |
| B8ZS: | MUX DSX1: F1A-5-24-45 |
| Site: 2202A | MUX Site: 2202A |
| Address: 5155 Clark Howell Hwy | Address: 5155 Clark Howell Hwy |
| Comment: | Comment: |
| Bay: 212.11 | Test Pair 1: 34-60 |
| Bank: 5BL | Tie Pair 1: TI05-139 |
| DSX1: F1A-10-4-1 | Test Pair 2: |
| TRI DF Loc: F21-Q88 | Tie Pair 2: |
| Comment: | Test Eq: COP |

Systems on this MUX

| Port | SID | CA-1st Pair |
|---|---|---|
| 2-1 | 5024 | PG72-101 |
| 3-1 | 5023 | PG72-1 |
| 4-1 | 5004 | PG72-1901 |
| 5-1 | 5003 | PG72-1801 |
| 6-1 | 5002 | PG72-301 |
| 7-1 | 5001 | PG72-201 |

Test Pair Multiple

| SID | Bay or MTB | Bk or Sw Eq | Cmnt or TBCU | TRI DF Loc |
|---|---|---|---|---|
| 5001 | 212.10 | 2BL | | F21-Q88 |
| 5002 | 212.10 | 2WH | | F21-Q88 |
| 5003 | 212.11 | 5BL | | F21-Q88 |
| 5004 | 212.11 | 5WH | | F21-Q88 |
| 5023 | 212.10 | 1BL | | F21-Q88 |
| 5024 | 212.10 | 1WH | | F21-Q88 |
| 5029 | 212.12 | 3BL | | F21-K88 |
| 5030 | 212.12 | 3WH | | F21-K88 |

| Containing BUFFINGTON | | | Sorted by System ID | | | | Page 1 of 1 | 8/9/2002 | |
|---|---|---|---|---|---|---|---|---|---|
| SID | Type | Cable & Pair | I | Z | Site | Street Address | Bay or MTB | Bk or Sw Eq |
| 2001 | discs | FPG15-0001 | N | N | 3123B | 5711 Buffington Rd | 278.16 | 1 |
| 2002 | discs | FPG15-0101 | N | Y | 3123B | 5711 Buffington Rd | | |
| 2901 | discs | FPG21-0001 | Y | N | 3123B | 5711 buffington rd | 048-0-0-01-12 | 67-1-4 |
| 2902 | discs | FPG21-0101 | Y | N | 3123B | 5711 buffington rd | 048-0-0-01-12 | 67-0-5 |
| 2903 | discs | FPG21-0201 | Y | Y | 3123B | 5711 Buffington Rd | | |
| 2999 | discs | FPG16-0701 | N | Y | 3123B | 5711 Buffington Rd | | |
| 5451 | SLC5 | PG86-3101 | N | N | 3123A | 5200 BUFFINGTON RD | 285.07 | 6BL |
| 9084 | 96SLT | PG84-1101 | N | N | 3117A | 5101 Buffington Rd | 212.07 | 3 |
| 9085 | 96SLT | PG84-1201 | N | N | 3117A | 5101 Buffington Rd | | |

Figure 2

| Containing BUFFINGTON | | | | | | Sorted by System ID | | | Page 1 of 1 | | | | 8/9/2002 |
|---|---|---|---|---|---|---|---|---|---|---|---|---|---|
| SID | Type | Cable & Pair | 1 | Z | Site | Street Address | MUX Type | Bay-Sh-M | G-P | Site | Address |
| 2001 | discs | FPG15-0001 | N | N | 3123B | 5711 Buffington Rd | DDM-2000 | 218.04-6-A | 1-1 | 3123B | 5711 Buffington Rd |
| 2002 | discs | FPG15-0101 | N | Y | 3123B | 5711 Buffington Rd | DDM-2000 | 218.04-6-A | 5-1 | 3123B | 5711 Buffington Rd |
| 2901 | discs | FPG21-0001 | Y | N | 3123B | 5711 buffington rd | DDM-2000 | 218.04-6-A | 2-1 | 3123B | 5711 Buffington Rd |
| 2902 | discs | FPG21-0101 | Y | N | 3123B | 5711 buffington rd | DDM-2000 | 218.04-6-A | 3-1 | 3123B | 5711 Buffington Rd |
| 2903 | discs | FPG21-0201 | Y | Y | 3123B | 5711 Buffington Rd | DDM-2000 | 218.04-6-A | 6-1 | 3123B | 5711 Buffington Rd |
| 2999 | discs | FPG16-0701 | N | Y | 3123B | 5711 Buffington Rd | | | | | |
| 5451 | SLC5 | PG86-3101 | N | N | 3123A | 5200 BUFFINGTON RD | DDM-2000 | 216.17-6-A | 1-1 | 3123A | 5200 Buffington Rd |
| 9084 | 96SLT | PG84-1101 | N | N | 3117A | 5101 Buffington Rd | DDM-2000 | 209.10-6-A | 1-1 | 3117A | 5101 Buffington Rd |
| 9085 | 96SLT | PG84-1201 | N | N | 3117A | 5101 Buffington Rd | DDM-2000 | 209.10-6-A | 2-1 | 3117A | 5101 Buffington Rd |

Figure 3

| Containing BUFFINGTON | | | | | | Sorted by System ID | | Page 1 of 1 | 8/9/2002 | |
|---|---|---|---|---|---|---|---|---|---|---|
| SID | Type | Cable & Pair | I | Z | Site | Street Address | Test Equipment | Test Pair 1 | Test Pair 2 |
| 2001 | discs | FPG15-0001 | N | N | 3123B | 5711 Buffington Rd | MCU | FPG15-3 | FPG15-4 |
| 2002 | discs | FPG15-0101 | N | Y | 3123B | 5711 Buffington Rd | VVV | FPG15-101 | |
| 2901 | discs | FPG21-0001 | Y | N | 3123B | 5711 buffington rd | MCU | FPG15-3 | FPG15-4 |
| 2902 | discs | FPG21-0101 | Y | N | 3123B | 5711 buffington rd | MCU | FPG15-3 | FPG15-4 |
| 2903 | discs | FPG21-0201 | Y | Y | 3123B | 5711 Buffington Rd | VVV | FPG15-101 | |
| 2999 | discs | FPG16-0701 | N | Y | 3123B | 5711 Buffington Rd | | | |
| 5451 | SLC5 | PG86-3101 | N | N | 3123A | 5200 BUFFINGTON RD | | PG86-3101 | PG86-3102 |
| 9084 | 96SLT | PG84-1101 | N | N | 3117A | 5101 Buffington Rd | | PG84-1101 | PG84-1102 |
| 9085 | 96SLT | PG84-1201 | N | N | 3117A | 5101 Buffington Rd | | PG84-1101 | PG84-1102 |

Figure 4

| Containing BUFFINGTON | | | Sorted by System ID | | | | Page 1 of 1 | 8/9/2002 | |
|---|---|---|---|---|---|---|---|---|---|
| SID | Type | Cable & Pair | I | Z | Site | Street Address | DSX1 | | MUX DSX1 |
| 2001 | discs | FPG15-0001 | N | N | 3123B | 5711 Buffington Rd | F1X-3-1-1 | | F1E-01B-12A-1 |
| 2002 | discs | FPG15-0101 | N | Y | 3123B | 5711 Buffington Rd | | | F1E-01B-12A-17 |
| 2901 | discs | FPG21-0001 | Y | N | 3123B | 5711 buffington rd | F1C-1-14-13 | | F1E-01B-12A-5 |
| 2902 | discs | FPG21-0101 | Y | N | 3123B | 5711 buffington rd | F1E-1A-13-56 | | F1E-01B-12A-9 |
| 2903 | discs | FPG21-0201 | Y | Y | 3123B | 5711 Buffington Rd | | | F1E-01B-12A-21 |
| 2999 | discs | FPG16-0701 | N | Y | 3123B | 5711 Buffington Rd | | | |
| 5451 | SLC5 | PG86-3101 | N | N | 3123A | 5200 BUFFINGTON RD | F1E-C01-10B-3 | | F1E-C01-6A-1 |
| 9084 | 96SLT | PG84-1101 | N | N | 3117A | 5101 Buffington Rd | F1A-1-21-2 | | F1E-6-6A-1 |
| 9085 | 96SLT | PG84-1201 | N | N | 3117A | 5101 Buffington Rd | | | F1E-6-6A-5 |

Figure 5

Custom Search Results    Sorted by System ID    Page 1 of 1    8/10/2002

| SID | Type | Cable & Pair | I | Z | Site | Street Address | Bay or MTB | Bk or Sw Eq | Test Equipment | Test Pair 1 | Test Pair 2 |
|---|---|---|---|---|---|---|---|---|---|---|---|
| 5021 | SLC5 | PG72-2001 | N | N | 2201A | 500 Lake Mirror Rd | 212.11 | 6BL | | 66-200 | |
| 5045 | SLC5 | PG73-2001 | N | N | 3501A | Midfield Terminal | 212.13 | 6BL | COP | 65-1450 | |
| 5067 | SLC5 | PG75-2001 | N | N | 1173A | 1122 Milledge Ave | 212.15 | 5BL | MCU5404 212.15 | PG75-1811 | PG75-1812 |
| 5091 | SLC5 | PG74-2001 | N | N | 3401A | 2385 Godby Rd | 212.17 | 6BL | | 43-436 | |
| 5127 | SLC5 | PG76-2001 | N | N | 4109A | 3816 Washington Rd | 214.19 | 6BL | | PG76-2349 | PG76-2350 |
| 5163 | SLC5 | PG77-2001 | N | N | 4111A | 4137 Washington Rd | 214.15 | 6BL | MCU | PG77-1875 | PG77-1876 |
| 5199 | SLC5 | PG78-2001 | Y | N | 1110A | 2719 Blount St | 007-0-0-01-13 | 58-4-2 | | PG78-2631 | PG78-2632 |
| 5235 | SLC5 | PG79-2001 | N | N | 1120A | 2611 Springdale Rd | 214.04 | 1BL | | PG79-2011 | PG79-2012 |
| 5271 | SLC5 | PG80-2001 | N | N | 1173A | 1122 Milledge Ave | 214.07 | 1BL | | PG75-1813 | PG75-1814 |
| 5307 | SLC5 | PG81-2001 | N | N | 4119A | 2664 Bryant Dr | 214.10 | 1BL | | PG81-1901 | PG81-1902 |
| 5387 | SLC5 | PG82-2001 | N | N | 1118A | 2096 Stewart Ave | 214.00 | 6BL | MCU | PG80-3367 | PG80-3368 |
| 5391 | 5M2 | PG83-2001 | Y | N | 1112A | 385 CONNELL AV | 048-0-1-08-13 | 58-1-2 | | | |
| 5427 | S5T | PG84-2001 | Y | N | 2125C | 1234 TOFFIE TER | 007-0-1-10-12 | 61-5-1 | | PG82-401 | PG82-402 |
| 8021 | SLC2T | PG85-2001 | N | N | 7777A | 3065 Main St | 216.20 | 3L | MCU | PG85-901 | PG85-902 |
| 9039 | 96S51 | FS70-2001 | N | N | 1118A | 2096 Stewart Ave | 212.04 | 3 | MCU | PG80-3367 | PG80-3368 |
| 9066 | SLC96 | FS71-2001 | N | N | 3302A | 4145 Welcome All Rd | 212.08 | 6 | DCT | 48-621 | |

Figure 8

SID: 5003

| | |
|---|---|
| Eq Type: SLC5 | MUX Type: DDM-1000 |
| Ca-First Pair: PG72-1801 | Bay-SH-Muldem: 209.02-7-B |
| Integrated: N | MUX Port: 5-1 |
| B8ZS: | MUX DSX1: F1A-5-24-45 |
| Site: 2202A | MUX Site: 2202A |
| Address: 5155 Clark Howell Hwy | Address: 5155 Clark Howell Hwy |
| Comment: | Comment: |
| Bay: 212.11 | Test Pair 1: 34-60 |
| Bank: 5BL | Tie Pair 1: TI05-139 |
| DSX1: F1A-10-4-1 | Test Pair 2: |
| TRI DF Loc: F21-Q88 | Tie Pair 2: |
| Comment: | Test Eq: COP |

| Systems on this MUX ||| Test Pair Multiple |||||
|---|---|---|---|---|---|---|---|
| Port | SID | CA-1st Pair | SID | Bay or MTB | Bk or Sw Eq | Cmnt or TBCU | TRI DF Loc |
| 2-1 | 5024 | PG72-101 | 5001 | 212.10 | 2BL | | F21-Q88 |
| 3-1 | 5023 | PG72-1 | 5002 | 212.10 | 2WH | | F21-Q88 |
| 4-1 | 5004 | PG72-1901 | 5003 | 212.11 | 5BL | | F21-Q88 |
| 5-1 | 5003 | PG72-1801 | 5004 | 212.11 | 5WH | | F21-Q88 |
| 6-1 | 5002 | PG72-301 | 5023 | 212.10 | 1BL | | F21-Q88 |
| 7-1 | 5001 | PG72-201 | 5024 | 212.10 | 1WH | | F21-Q88 |
| | | | 5029 | 212.12 | 3BL | | F21-K88 |
| | | | 5030 | 212.12 | 3WH | | F21-K88 |

Figure 9

2002
FPG15 -- 101

B8ZS
Site: 3123B
5711 Buffington Rd

MUX: 218.04-6-A
MUX DSX: F1E-01B-12A-17
5/3/02

Figure 10

SID: 2001

| | |
|---|---|
| Eq Type: discs | MUX Type: DDM-2000 |
| Ca-First Pair: FPG15-1 | Bay-SH-Muldem: 218.04-6-A |
| Integrated: N | MUX Port: 1-1 |
| B8ZS: N | MUX DSX1: F1E-01B-12A-1 |
| Site: 3123B | MUX Site: 3123B |
| Address: 5711 Buffington Rd | Address: 5711 Buffington Rd |
| Comment: | Comment: |
| Bay: 278.16 | Test Pair 1: FPG15-3 |
| Bank: 1 | Tie Pair 1: T108-896 |
| DSX1: F1X-3-1-1 | Test Pair 2: FPG15-4 |
| TRI DF Loc: F20-J20 | Tie Pair 2: T108-895 |
| Comment: | Test Eq: MCU |

| Systems on this MUX | | | Test Pair Multiple | | | | |
|---|---|---|---|---|---|---|---|
| Port | SID | CA-1st Pair | SID | Bay or MTB | Bk or Sw Eq | Cmnt or TBCU | TRI DF Loc |
| 1-1 | 2001 | FPG15-1 | 2901 | 048-0-0-01-12 | 67-1-4 | 1-P2B M06 | F21-J93 |
| 2-1 | 2901 | FPG21-1 | 2902 | 048-0-0-01-12 | 67-0-5 | 1-P2B M06 | F21-J93 |
| 3-1 | 2902 | FPG21-101 | 2001 | 278.16 | 1 | | F20-J20 |
| 5-1 | 2002 | FPG15-101 | | | | | |
| 6-1 | 2903 | FPG21-201 | | | | | |

Figure 13

| Containing 218.04 | | Sorted by System ID | | | | | | Page 1 of 1 | | 8/10/2002 |
|---|---|---|---|---|---|---|---|---|---|---|
| SID | Type | Cable & Pair | 1 | Z | Site | Street Address | MUX Type | Bay-Sh-M | G-P | Site | Address |
| 2001 | discs | FPG15-0001 | N | N | 3123B | 5711 Buffington Rd | DDM-2000 | 218.04-6-A | 1-1 | 3123B | 5711 Buffington Rd |
| 2002 | discs | FPG15-0101 | N | Y | 3123B | 5711 Buffington Rd | DDM-2000 | 218.04-6-A | 5-1 | 3123B | 5711 Buffington Rd |
| 2901 | discs | FPG21-0001 | Y | N | 3123B | 5711 buffington rd | DDM-2000 | 218.04-6-A | 2-1 | 3123B | 5711 Buffington Rd |
| 2902 | discs | FPG21-0101 | Y | N | 3123B | 5711 buffington rd | DDM-2000 | 218.04-6-A | 3-1 | 3123B | 5711 Buffington Rd |
| 2903 | discs | FPG21-0201 | Y | Y | 3123B | 5711 Buffington Rd | DDM-2000 | 218.04-6-A | 6-1 | 3123B | 5711 Buffington Rd |
| 5415 | SLC5 | PG82-4501 | N | Y | 2127C | 1025 Virginia Ave | DDM-2000 | 218.04-1-A | 1-1 | 2127C | 1025 Virginia Ave |
| 5435 | SER5 | PG86-1501 | N | Y | 2202B | Atlanta South Pkwy | DDM-2000 | 218.04-2-A | 5-1 | 2202B | Atlanta South Pkwy |
| 5436 | SER5 | PG86-1601 | N | Y | 2202B | Atlanta South Pkwy | DDM-2000 | 218.04-2-A | 6-1 | 2202B | Atlanta South Pkwy |

Figure 14

METHOD FOR PROVIDING DIGITAL LOOP CARRIER DATA FOR USE IN A CENTRAL OFFICE

TECHNICAL FIELD

The present invention is directed in general to providing data, and in particular to providing data for use in a central office.

BACKGROUND

Technology, especially computer technology, has made it easier to collect and store information and data. However, in order for data to be useful, the data must be readily available and organized in a manner that is relevant to a user. For example, in the telecommunications field, data is maintained for the various equipment in the telecommunications network, such as switches and local loops. The data is used by a variety of users for a variety of purposes. For example, a central office technician, a network engineer and a loop tester may use data that describes the equipment in a central office. However, since the users' needs differ, the data needs to be tailored to each user's specific needs to maximize the usefulness of the data. Unfortunately, the data is not always tailored to meet each user's specific needs.

In particular, a central office technician needs data describing the equipment and wiring associated with a central office. The data is used for provisioning, verifying equipment assignments and troubleshooting. In particular, data about the digital loop carrier ("DLC") systems, multiplexers, and test pairs in the central office is needed. Some of this information may be currently collected for other purposes, but some of this information is not currently collected. However, even if the information is currently collected, the information may not be readily available to the central office technician or may not be available in a form that is useful to the central office technician.

Some central offices use labels attached to equipment bays to provide some of the necessary information. For example, when equipment is installed in a central office, a small label is attached to the bay that provides information about the equipment. The label may include a system identifier or information about related equipment, such as a multiplexer. However, the use of labels is problematic because every piece of equipment may not be labeled, the information that can be shown on a label is limited, and the labels can fall off so that the information is lost.

Some technicians remember information about the equipment in the central office or keep a set of personal notes. However, once these technicians leave the central office, the information is no longer available. Without access to the information, a technician must walk around the central office and try and collect the information or try and get the information from a source that is not tailored to the technician's needs. In a large central office, walking around the facility to obtain the information is very inefficient.

Once the information is collected, the collected information must be properly maintained. Information related to DLC systems can change over time. Some information changes frequently, some information changes less frequently and some information does not change at all unless the equipment is removed. If the data is not properly maintained, then data inaccuracies occur. Data inaccuracies can result in customer service interruptions or in time wasted by a technician as the technician tries to resolve or work around the problem.

Thus, there is a need for providing information to a technician in a central office that is useful for provisioning, assigning equipment and troubleshooting. The information should be organized so that it facilitates the technician's tasks and should be adapted for use in both large and small central offices. The information also should be readily accessible to the technician. In addition, the information should be maintained so that data inaccuracies are minimized.

SUMMARY

The present invention meets the needs described above by providing a digital loop carrier (DLC) information system in a central office. The DLC information system includes four related databases: 1) a DLC system database, 2) a multiplexer database, 3) an equipment location database, and 4) a test pair database. The information in the databases is related through the system identifiers for the DLC systems.

The DLC system database includes information about the DLC systems associated with the central office. The DLC system database includes information describing the type of DLC equipment, an identifier for the first cable pair on the DLC system, an indication of whether the DLC system is an integrated system, an indication of whether B8ZS line coding is used, the site identifier for the location of the DLC system, and the street address for the location of the DLC system.

The equipment location database includes information describing the location of the DLC equipment in the central office. The equipment location database includes information for both integrated and non-integrated systems. For a non-integrated system, the equipment location database includes information that identifies the bay and bank where the DLC equipment is located and the wiring locations for the DLC system. For an integrated system, the equipment location database includes information that identifies the MTB (metallic test bus), the switch equipment and the test bus control unit for the DLC system.

The multiplexer database includes information describing the multiplexers associated with the DLC systems in the DLC system database. In particular, the multiplexer database includes information describing the type of multiplexer, the location of the multiplexer within the central office, the wiring information for the multiplexer, the site identifier for the location of the multiplexer, and the street address for the multiplexer. The multiplexer location information includes the bay and shelf where the multiplexer is located in the central office, as well as the MULDEM (multiplexer/demultiplexer) and group-port of the multiplexer used.

The test pair database identifies the test pair associated with the DLC system, as well as the type of test equipment used. If tie pairs are used, then information on the tie pairs is available in the test pair database. Tie pairs are used in larger central offices that require wiring between floors.

The DLC information system allows a user to search for the information stored in the database, display the search results, print reports and to assign and unassign equipment, such as multiplexers. If a search identifies a single DLC system, then information from the DLC system database, information from the multiplexer database, information from the test pair database and information from the equipment location database for that DLC system can be displayed simultaneously.

If a search identifies multiple DLC systems, then the information for all relevant DLC systems is provided. The user can elect to display (or print) some or all the information. For example, the user can elect to receive 1) all data; 2) multiplexer data; 3) test pair data, 4) bay or MTB data; 5) wiring location data, and/or 6) comment data.

The DLC information system identifies all of the DLC systems that share the multiplexer and the test pair associated with a particular DLC system. This assists in troubleshooting because equipment failures can be easily identified. For example, if there are problems with a number of DLC systems and that DLC systems share the same multiplexer, then it is likely that the multiplexer has failed.

These and other aspects, features and advantages of the present invention may be more clearly understood and appreciated from a review of the following detailed description of the disclosed embodiments and by reference to the appended drawings and claims.

BRIEF DESCRIPTION OF THE DRAWINGS

FIG. 2 illustrates DLC system and equipment location information in accordance with an embodiment of the invention.

FIG. 3 illustrates DLC system and multiplexer information in accordance with an embodiment of the invention.

FIG. 4 illustrates DLC system and test pair information in accordance with an embodiment of the invention.

FIG. 5 illustrates DLC system and wiring location information in accordance with an embodiment of the invention.

FIG. 8 illustrates the results of a field specific search in accordance with an embodiment of the invention.

FIG. 9 illustrates a DLC system report in accordance with an embodiment of the invention.

FIG. 10 illustrates a label in accordance with an embodiment of the invention.

FIG. 13 illustrates a DLC system report in accordance with an embodiment of the invention.

FIG. 14 illustrates DLC system and multiplexer information in accordance with an embodiment of the invention.

DETAILED DESCRIPTION

Figure 1:
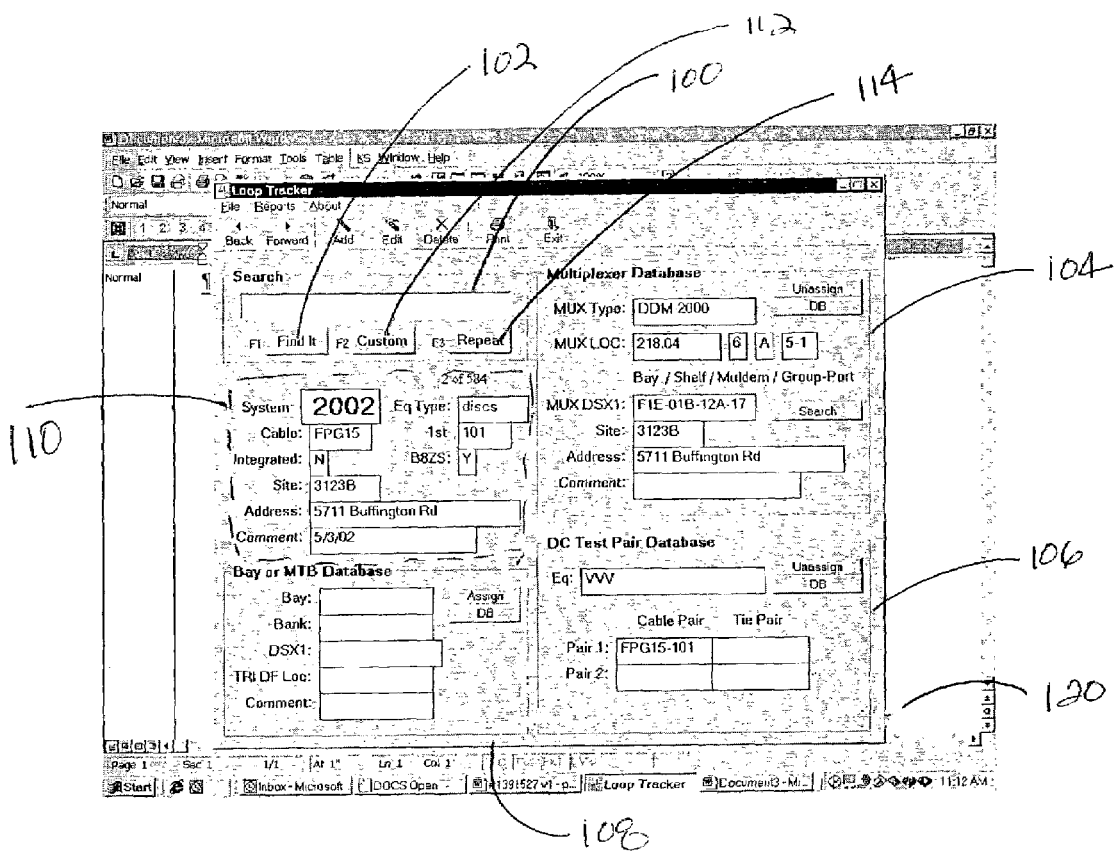
FIG. 1 illustrates the search screen for a DLC information system in accordance with an embodiment of the invention.

The present invention is directed to a method for providing information for use in a central office. Briefly described, the invention provides a digital loop carrier ("DLC") information system that includes four related databases. A DLC system database provides information about DLC systems, a multiplexer database provides information about multiplexers associated with the DLC systems, an equipment location database provides information about the location of the DLC systems and a test pair database provides information about the test pairs used to test the DLC systems. The information in each of the databases is related using the system identifiers for the DLC systems.

DLC Information System

The DLC information system is available in a central office. The system can be a stand-alone system that supports a single central office or can be a networked system that supports a number of central offices. The system can operate on any type of computing device, such as a desktop computer, laptop computer, hand held computer, etc. A central office typically includes a switch, a number of DLC systems and multiplexers, as well as additional telecommunications equipment. A DLC system is part of a local loop that connects subscriber equipment, such as a telephone, facsimile machine or modem, to the switch in the central office.

The DLC information system includes four related databases: 1) the DLC system database, 2) the multiplexer database, 3) the equipment location database, and 4) the test pair database. The information in the databases is related through the system identifiers for the DLC systems. The information in the four databases can be obtained from existing databases, if the information is available and reliable, or can be obtained via data entry.

The DLC system database includes information about the DLC systems associated with the central office. In one embodiment, each central office has its own DLC information system. In another embodiment, a single DLC information system serves multiple central offices. The DLC system database includes information describing the type of DLC equipment. For example, SLC5 indicates a SLC series 5 model DLC system offered by Lucent. The DLC system database also includes information identifying the first cable pair on the DLC system. Individual service channels on a DLC system are given identifiers just as if the channels were associated with pairs of wires. The first cable pair refers to the first pair in a cable for a given system.

The DLC system database includes an indication of whether the DLC system is an integrated system, i.e. whether the DLC system is integrated into a switch. For example, "Y" indicates that the system is integrated and "N" indicates that the system is not integrated. If the system is not integrated, then the central office includes additional equipment to multiplex/demultiplex the telephone channels before they are connected to a switch or to other equipment. A system that is not integrated is referred to as a "universal" system.

The site identifier for the location of the DLC system and the street address for the location of the DLC system are also included in the DLC system database. The site identifier identifies the remote end of the DLC system. Multiple DLC systems may be located at the same site. The DLC system database also indicates whether B8ZS line coding is used. B8ZS line coding enables a T1 line to transmit zeroes without degrading signal quality. The DLC system database also includes an optional comments field. For example, a comment that this equipment is associated with FAA service or that the equipment is located across the street from a well-known landmark can be included in the comments field.

The equipment location database includes information describing the location of the DLC equipment in the central office. The type of information stored in the equipment location database depends upon whether the DLC system is a universal system or an integrated system.

If the system is a universal system (not integrated), then the equipment location database identifies the bay and bank (shelf) where the DLC equipment is located, as well as the DSX1 for the DLC system. The DSX1 is the DS1 cross-connect location for the bay and bank and is identified by frame, bay, panel and jack. The equipment location database also includes information on the location of the tip, ring and inhibit leads (TRI DF Loc) for the bay and bank. The tip, ring and inhibit leads are located on a distributing frame and can be connected to the DC test pairs. The TRI DF Loc information identifies the frame, as well as the horizontal and vertical locations.

If the system is integrated, then the equipment location database includes information about the MTB (metallic test bus) and the integrated switch equipment. The information identifies the MTB that provides access to the DC test pairs and the switch equipment (Sw Eq). The format of the switch equipment information may vary based on the type of switch. The equipment location database also identifies the terminal assigned as the TBCU (test bus control unit). The TBCU is separate from the switch but is used by the switch to gain access to the DC test pairs.

In one embodiment, the same fields are used to store information for universal systems and integrated systems as shown in Table 1.

TABLE 1

| Universal | Integrated |
|---|---|
| Bay | MTB |
| Bank | Sw Eq |
| DSX1 | DSX1 |
| TRI DF Loc | TRI DF Loc |
| Comment | TBCU |

The multiplexer database includes information describing the multiplexers associated with the DLC systems in the DLC system database. In particular, the multiplexer database includes information describing the type of multiplexer, the location of the multiplexer within the central office, the site identifier for the location of the multiplexer, and the street address for the multiplexer. For example, DDM-2000 is a particular model of an M13 multiplexer offered by Lucent. The multiplexer location information includes the bay and shelf where the multiplexer is located in the central office, as well as the MULDEM (multiplexer/demultiplexer) and group-port of the multiplexer used.

The multiplexer database also identifies the location for the DS1 cross-connect for the first port of the multiplexer (MUX DSX1). Although the DSX1 and service assignments for every port on the multiplexer are included in the multiplexer database, the information may not be presented on the search screen. If so, the information is accessible via the database (DB) option. The site identifier and the street address for the multiplexer are also included in the multiplexer database. The multiplexer may be located at a different site than the site for the DLC system that it serves. The multiplexer database also includes an optional comments field.

The test pair database identifies the test pair (Pair 1, Pair 2) associated with the DLC system, as well as the type of test equipment (Eq) used. Multiple DLC systems can be assigned to a single test pair. If the assigned test pair is not a copper pair, then two pairs are required. If tie pairs are used, then information on the tie pairs is available in the test pair database. Tie pairs are used in larger central offices that require wiring between floors.

Searching Using the DLC Information System

The DLC information system provides a search field and supports searching for any of the information stored in the databases. Typically, a user, such as a central office technician, searches the system using a DLC system identifier, a cable pair identifier, site identifier or site address. A typical search screen 120 is shown in FIG. 1. The information illustrated in FIG. 1 is from a previous search. To begin a new search, the user enters a search term in the search field 100 and initiates the search by depressing the F1 or Enter key or by selecting the Find It option 102.

If the search term is associated with a single DLC system, then the information for that DLC system is provided on the screen. For example, the information shown in FIG. 1 is the result of a search that specified "2002". In this example, the search identified a single DLC system, so only the information for that system is displayed. The information displayed on the screen corresponds to the information stored in the four databases. FIG. 1 illustrates that information from the DLC system database 110, information from the multiplexer database 104, information from the test pair database 106 and information from the equipment location database 108 for a DLC system can be displayed simultaneously.

If a search term is associated with multiple DLC systems, then the information for all relevant DLC systems is provided. In one embodiment if the search term is associated with multiple DLC systems, then the user is provided with the option to select which data associated with the DLC systems should be returned. For example, the user is given the option to receive 1) all data; 2) multiplexer data; 3) test pair data, 4) bay or MTB data; 5) wiring location data, and/or 6) comment data. For example, searching for "Buffington" identifies multiple DLC systems. If the user elects to receive bay or MTB data, i.e. equipment location data, then the information shown in FIG. 2 is presented. The information in FIG. 2 includes fields for a system identifier (SID), DLC equipment type (Type), cable pair identifier (Cable & Pair), an integrated system indicator (I), a B8ZS indicator (Z), a site identifier for the location of the DLC system (Site), a street address for the location of the DLC system, a bay or MTB identifier (Bay or MTB), and a bank or switch equipment identifier (Bk or Sw Eq). The information in the first seven fields (SID, Type, Cable & Pair, I, Z, Site and Street Address) is from the DLC system database and the information in the remaining two fields (Bay or MTB and Bk or Sw Eq) is from the equipment location database.

If the user elects to receive multiplexer data, then the information shown in FIG. 3 is presented. The information in FIG. 3 includes the same DLC system information shown in FIG. 2 (SID, Type, Cable & Pair, I, Z, Site and Street Address), as well as multiplexer information from the multiplexer database. The multiplexer information includes the type of multiplexer (MUX Type), identifiers for the bay, shelf and MULDEM (Bay-Sh-M) and the group-port (G-P), as well as a site identifier for the location of the multiplexer (Site), and a street address for the location of the multiplexer (Address).

If the user elects to receive test pair data, then the information shown in FIG. 4 is presented. The information in FIG. 4 includes the same DLC system information shown in FIGS. 2 and 3, as well as test pair information from the test pair database. The test pair information includes the type of test equipment (Test Equipment) and the test pair identifiers (Test Pair 1 and Test Pair 2).

If the user elects to receive wiring location data, then the information shown in FIG. 5 is presented. The information in FIG. 5 includes the same DLC system information shown in FIGS. 2, 3 and 4, as well as wiring location information from the equipment location database and the multiplexer database. The wiring location information includes the wiring location for the DLC system (DSX1) and the wiring location for the multiplexer (MUX DSX1).

Figure 6:
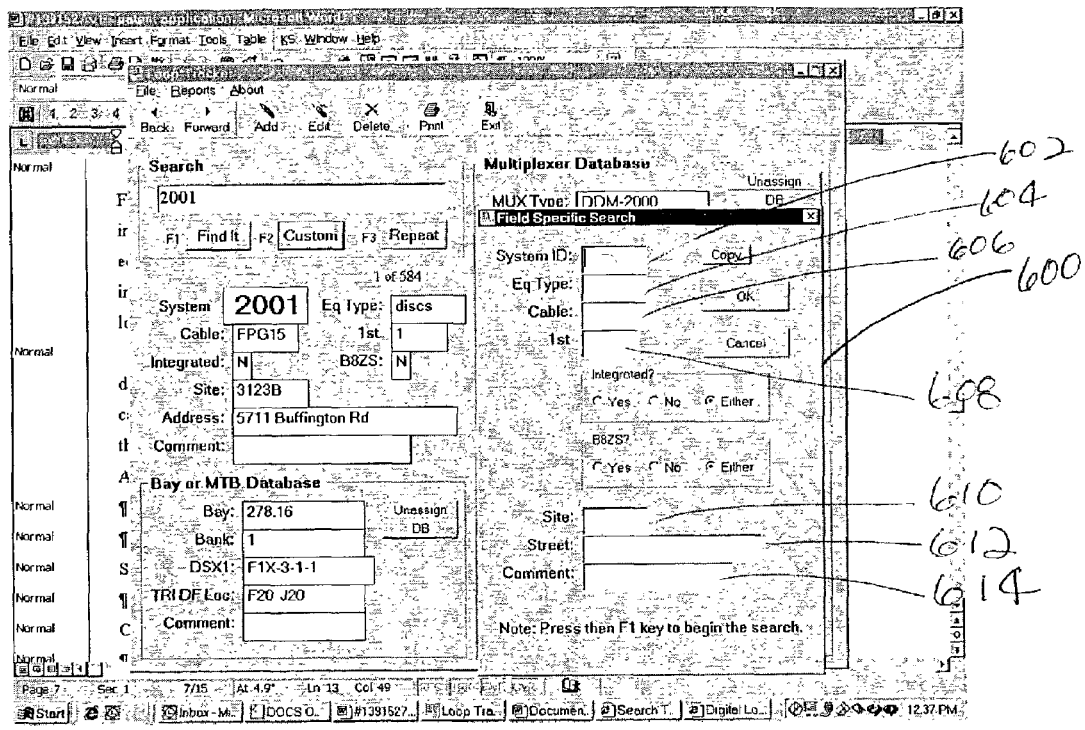
FIG. 6 illustrates a field specific search screen in accordance with an embodiment of the invention.

The DLC information system also supports custom searching. As previously described herein a search term may correspond to multiple DLC systems. If so, then a user can perform a custom search. To perform a custom search, the user enters a search term in the search field 100, FIG. 1 and depresses the F2 key or selects the Custom option 112. A custom search allows the user to specify a field so that the search locates the DLC system records that include the search term in the specified field. FIG. 6 illustrates the Field Specific Search display 600 that is presented to the user once the user enters "2001" as the search term and selects the Custom option. The Field Specific Search display allows the user to require that the search term be found in one of the following fields: 1) system ID 602, 2) equipment type 604, 3) cable pair 606, 4) first cable pair 608, 5) site ID 610, 6) street address 612 or 7) comment 614.

Figure 7:
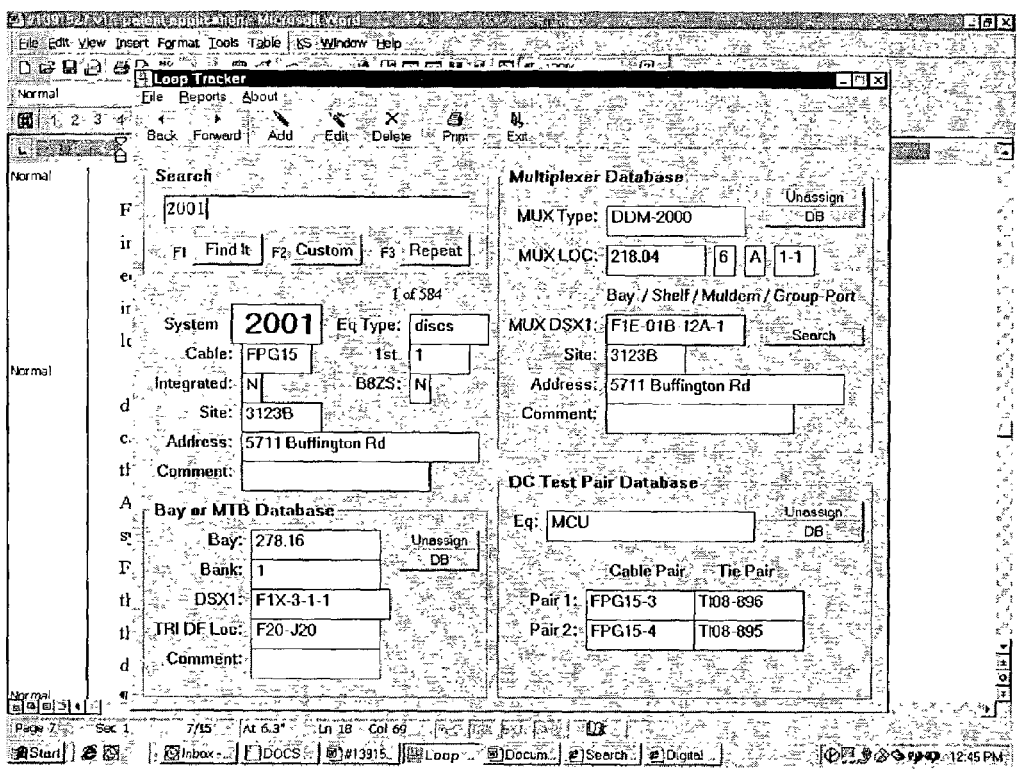
FIG. 7 illustrates the results of a field specific search in accordance with an embodiment of the invention.

If the user is searching for information for the DLC system identified by system ID 2001, then the user enters "2001" into the System ID field 602 and depresses the F1 key or selects the OK option to begin the search. The search results for this search are shown in FIG. 7. FIG. 7 shows the information for DLC system 2001. However, if the user is searching for information for DLC systems with first cable pairs that include 2001, then the user enters "2001" into the $1^{st}$ field. The search results for this search are shown in FIG. 8. FIG. 8 shows all of the records for the DLC systems that have a first cable pair that includes 2001. If the user wants to repeat a custom search, then the user depresses the F3 key or selects the Repeat option 144, FIG. 1.

In addition to displaying information on a display device, the DLC information system can print reports or dump records to a file. Typically, any information that is displayed can be printed or dumped to a file. If a user selects Print while viewing information for a single DLC system from the search screen 120, FIG. 1, then a system report is printed. An exemplary system report is shown in FIG. 9 for DLC system 5003. In addition to the displayed information, the system report includes information on all of the DLC systems that share the multiplexer and the test pair associated with DLC system 5003. Other reports that can be generated include a DLC systems report, a site report and a missing data report. The DLC systems report includes information for all of the DLC systems. The site report includes information for all of the DLC systems at a particular site. The missing data report includes information for all of the DLC system records that are missing data, such as site, multiplexer, bay or MTB, or test pair data.

As shown in FIG. 1, a database option (DB) and an assign/unassign option (Assign or Unassign) are provided for the multiplexer database 104, test pair database 106 and equipment location database 108. The database option allows the user to display and print all of the information in the respective database. The database option also allows the user to add, delete or edit database records in the respective database. The assign/unassign option allows the user to assign or unassign a DLC system to a multiplexer, test pair or equipment location (bay). If the multiplexer, test pair, or bay is currently assigned, then the Unassign option is presented. If the multiplexer, test pair or bay is not currently assigned, then the Assign option is presented.

The DLC information system can also be used to assign and unassign multiplexers to equipment other than DLC systems. One way to assign or unassign a multiplexer is to select the database option for the multiplexer database. Once the list of all of the multiplexers is presented, the user selects a multiplexer and the multiplexer channel assignments are displayed. The user can assign a DLC system identifier or an identifier for another type of equipment to any channel that is not assigned or unassign any channel that is assigned. Using the multiplexer database to assign multiplexers allows the user to see which multiplexer channels are assigned, so that the user does not assign the channel to two different systems. In addition, the DLC information system does not permit two DLC systems to be assigned to the same multiplexer channel. The multiplexer database also has a search option that allows a user to search for multiplexer assignments by specifying a DLC system ID.

The DLC information system can also be used to print labels to attach to the bay where the DLC system equipment is located. FIG. 10 illustrates the information that is printed on a label. Typically, the information includes information from the DLC system database and the multiplexer database. For example, FIG. 10 illustrates a label that includes the DLC system ID, the first cable pair, the B8ZS indicator, the site identifier, the street address, the multiplexer location, and the multiplexer wiring location.

Loop Testing Example

The DLC information system can be used to resolve problems detected during loop testing. Loop testing is performed periodically to detect loop faults. Loop testing identifies faults, as well as untested lines. If a telephone number or a group of telephone numbers cannot be tested, then a trouble ticket or problem report is generated and forwarded to a technician at a central office. Typically, the trouble ticket includes a system identifier or system ID and identifies the untested telephone number(s). The central office technician debugs the problem using the DLC information system. The technician begins by entering the system identifier into the search field. Based on the system identifier, information about the multiplexer associated with the DLC system, the test pair used to test the DLC system, and the location of the DLC equipment is provided. The technician can check the wiring between the DLC system and its associated multiplexer by checking for continuity between the wiring location for the DLC system and the wiring location for the multiplexer.

Figure 11:
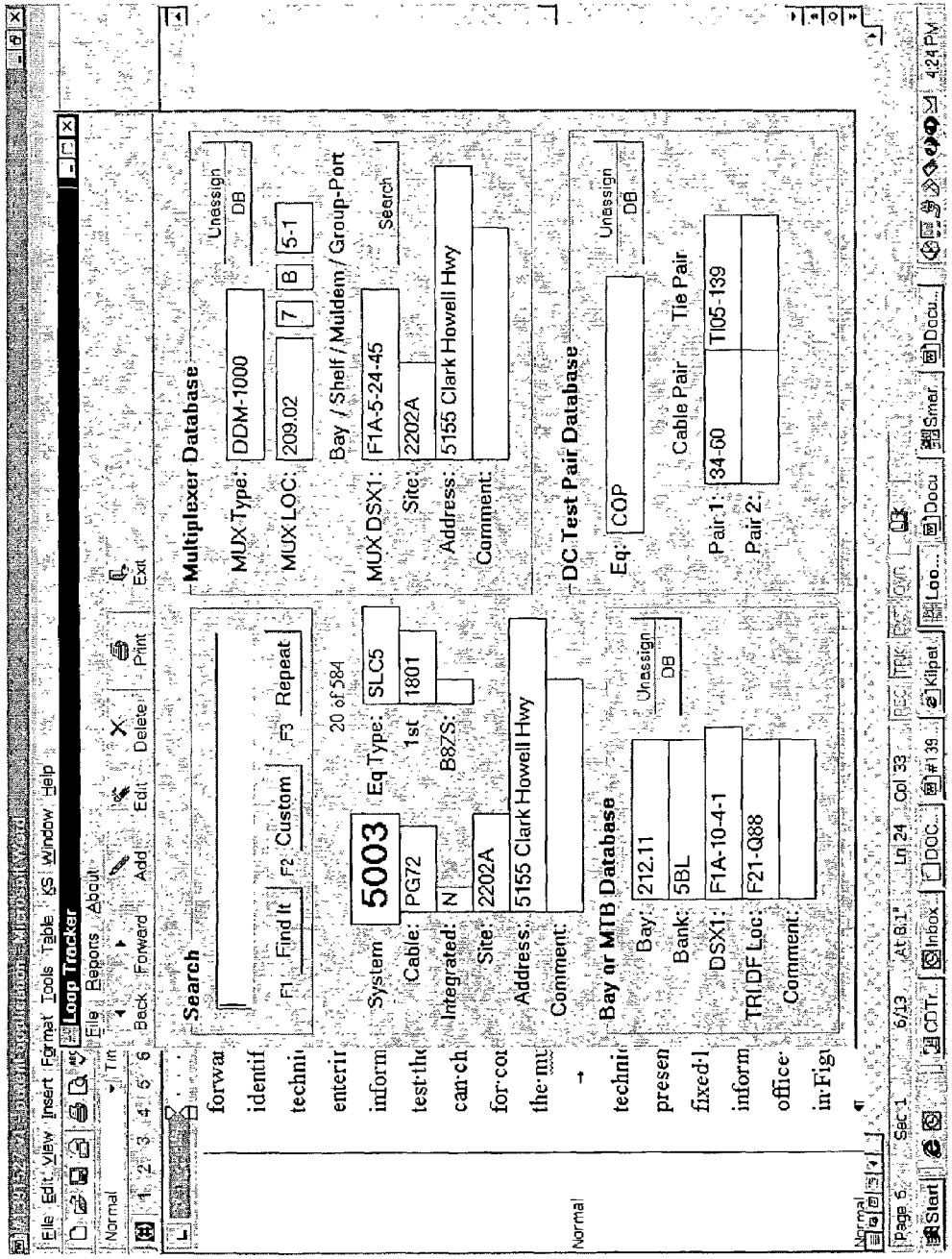
FIG. 11 illustrates the display of DLC system information in accordance with an embodiment of the invention.

For example, if the trouble ticket specifies "5003" as the system identifier, then the technician enters "5003" in the search field and the information shown in FIG. 11 is presented to the technician. Since the DLC information system may be a fixed system, e.g. a computer system placed on a desk, the technician may elect to print a report of the information shown on the screen so that the information can be carried around the central office by the technician. A system report that corresponds to the display of FIG. 11 is shown in FIG. 9. FIG. 9 includes all of the information shown in FIG. 11. In addition, FIG. 9 identifies all of the DLC systems associated with the multiplexer in the section entitled "Systems on this MUX" and all of the DLC systems associated with the test pair in the section entitled "Test Pair Multiple."

By identifying all of the DLC systems that are associated with the multiplexer (or the test pair), an equipment failure may be detected. For example, if a number of trouble tickets are generated that specify different system identifiers, then the DLC information system can be used to determine that all of the DLC systems are associated with the same multiplexer. Since the multiplexer is common to all of the problems, it is likely that the multiplexer has failed.

Equipment Failure Example

Figure 12:
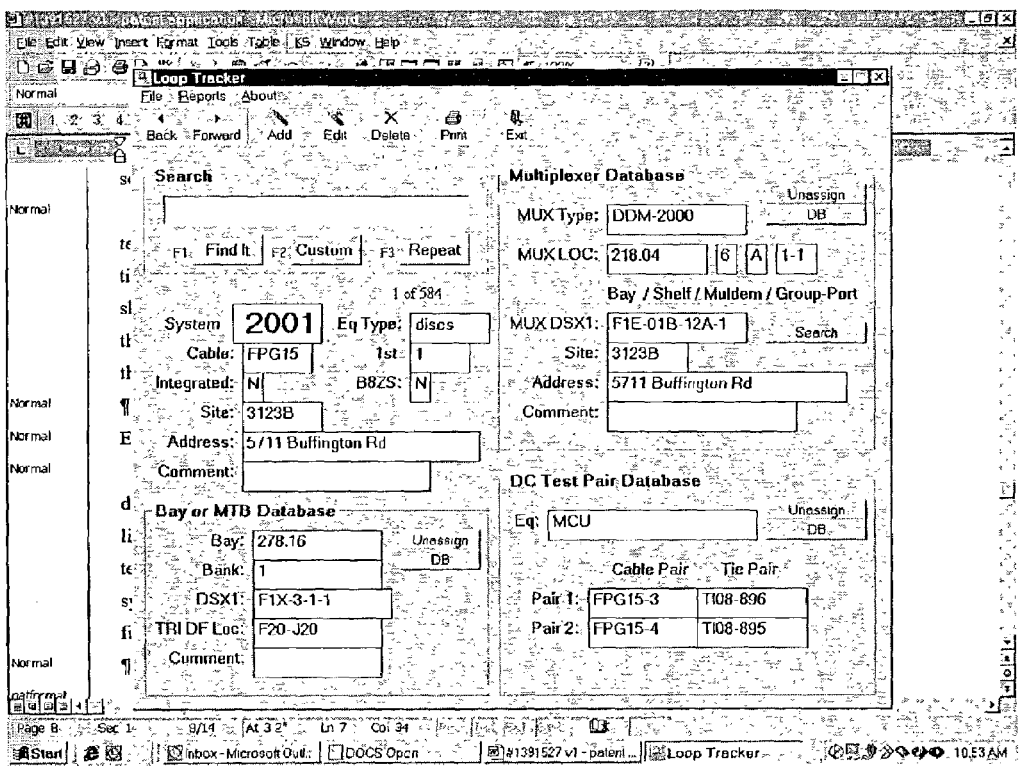
FIG. 12 illustrates the display of DLC system information in accordance with an embodiment of the invention.

The DLC information system can also be used to resolve equipment problems detected by the technician. DLC equipment typically includes an alarm indicator, such as a light. If the technician notices that several DLC systems are in an alarm state, then the technician can use the DLC information system to determine whether the DLC systems share equipment, such as a multiplexer. The technician can enter the bay identifier for the DLC system into the search field. If the technician enters "278.16" into the search field, then the information shown in FIG. 12 is presented. The technician can either print a system report to determine the other DLC systems that share the multiplexer or enter the multiplexer location information into the search field to display a list of the other DLC systems that share the multiplexer. FIG. 13 illustrates the system report and FIG. 14 illustrates the display of the multiplexer data. In this example, the search term is associated with multiple DLC systems. If the technician selects the option of displaying multiplexer data, then the information shown in FIG. 14 is displayed. In either event, if all of the DLC systems that are in an alarm state are associated with the same multiplexer, then it is likely that there is a problem with the multiplexer, rather than a problem with all of the DLC systems in alarm.

Additional alternative embodiments will be apparent to those skilled in the art to which the present invention pertains without departing from its spirit and scope. Accordingly, the scope of the present invention is described by the appended claims and is supported by the foregoing description.

What is claimed is:

1. A method for providing information for use in a central office, comprising:

for each of a plurality of digital loop carrier systems:
providing system information for the digital loop carrier system, the system information including a system identifier;
providing, equipment location information for the digital loop carrier system, the equipment location information including wiring information;
associating the equipment location information with the system information for the digital loop carrier system through the system identifier for the digital loop carrier system;
providing multiplexer information for a multiplexer associated with the digital loop carrier system;
associating the multiplexer information with the system information for the digital loop carrier system through the system identifier for the digital loop carrier system;
providing test pair information for a test pair associated with the digital loop carrier system;
associating the test pair information with the system information for the digital loop carrier system through the system identifier for the digital loop carrier system;
provide a system report that includes the system information, the equipment location information, the multiplexer information, and the test pair information; and
including missing data information with the system report, the missing data information comprising records that are missing data associated with at least one of the following: a digital loop carrier system database, a multiplexer database, an equipment location database, and a test pair database.

2. The method of claim 1, further comprising:
identifying all digital loop carrier systems connected to a multiplexer associated with a selected digital loop carrier system; and
identifying all digital loop carrier systems connected to a test pair associated with the selected digital loop carrier system.

3. The method of claim 1, wherein the system information includes location information for the central office.

4. The method of claim 1, wherein the location information for the central office is a site identifier.

5. The method of claim 1, wherein the location information for the central office is a street address.

6. The method of claim 1, wherein the digital loop carrier system information includes a type of digital loop carrier equipment.

7. The method of claim 1, wherein the multiplexer information includes a type of multiplexer equipment.

8. The method of claim 1, wherein the multiplexer information includes location information for the multiplexer equipment.

9. The method of claim 8, wherein the multiplexer location information includes a site identifier.

10. The method of claim 8, wherein the multiplexer location information includes a street address.

11. The method of claim 1, wherein the multiplexer information includes system identifiers for all digital loop carrier systems connected to the multiplexer.

12. The method of claim 1, wherein the test pair information includes system identifiers for all digital loop carrier systems connected to the test pair.

13. The method of claim 1, wherein the equipment location information includes a bay identifier for a bay in the central office.

14. A method for providing information for use in a central office, comprising:
receiving a query that includes a system identifier for a digital loop carrier system;
in response to the query:
providing system information for the digital loop carrier system, the system information including the system identifier and location information for the central office associated with the digital loop carrier system,
providing equipment location information associated with the system identifier, the equipment location information including location information for the digital loop carrier system equipment in the central office and wiring location information for the digital loop carrier system,
providing multiplexer information associated with the system identifier, the multiplexer information including location information for the multiplexer connected to the digital loop carrier system and wiring location information for the multiplexer, and
providing test pair information associated with the system identifier, the test pair information including an identifier for the test pair connected to the digital loop carrier system:
receive a request for a system report; and
in response to the request:
generating a system report that includes the system information, the equipment location information, the multiplexer information, and the test pair information, and
including missing data information with the system report, the missing data information comprising records that are missing data associated with at least one of the following: a digital loop carrier system database, a multiplexer database, an equipment location database, and a test pair database.

15. The method of claim 14, further comprising:
generating a system report that includes the system information, the equipment location information, the multiplexer information, and the test pair information, and that includes the system identifiers for all digital loop carrier systems connected to the multiplexer and the system identifiers for all digital loop carrier systems connected to the test pair.

16. The method of claim 14, wherein the location information for the central office includes a site identifier.

17. The method of claim 14, wherein the location information for the central office includes a street address.

18. The method of claim 14, wherein the digital loop carrier system information includes a type of digital loop carrier equipment.

19. The method of claim 14, wherein the multiplexer information includes a type of multiplexer equipment.

20. The method of claim 14, wherein the multiplexer information includes location information for the multiplexer equipment.

21. The method of claim 20, wherein the multiplexer location information includes a site identifier.

22. The method of claim 20, wherein the multiplexer location information includes a street address.

23. The method of claim 14, wherein the multiplexer location information includes system identifiers for all digital loop carrier systems connected to the multiplexer.

24. The method of claim 14, wherein the test pair location information includes system identifiers for all digital loop carrier systems connected to the test pair.

25. A system for providing information for use in a central office, the system comprising:
   a memory storage; and
   a processing unit coupled to the memory storage, wherein the processing unit is operative to:
      receive a query that includes a system identifier for a digital loop carrier system;
      in response to the query:
         provide system information for the digital loop carrier system, the system information including the system identifier and location information for the central office associated with the digital loop carrier system,
         provide equipment location information associated with the system identifier, the equipment location information including location information for the digital loop carrier system equipment in the central office and wiring location information for the digital loop carrier system,
         provide multiplexer information associated with the system identifier, the multiplexer information including location information for the multiplexer connected to the digital loop carrier system and wiring location information for the multiplexer,
         provide test pair information associated with the system identifier, the test pair information including an identifier for the test pair connected to the digital loop carrier system,
         identify all digital loop carrier systems connected to a multiplexer associated with a selected digital loop carrier system, and
         identify all digital loop carrier systems connected to a test pair associated with the selected digital loop carrier system;
      receive a request for a system report; and
      in response to the request:
         generate a system report that includes the system information, the equipment location information, the multiplexer information, and the test pair information, and that includes the system identifiers for all digital loop carrier systems connected to the multiplexer and the system identifiers for all digital loop carrier systems connected to the test pair, and
         include missing data information with the system report, the missing data information comprising records that are missing data associated with at least one of the following: a digital loop carrier system database, a multiplexer database, an equipment location database, and a test pair database.

\* \* \* \* \*